United States Patent

Peñaranda et al.

[11] Patent Number: 6,000,650
[45] Date of Patent: Dec. 14, 1999

[54] LID FOR CLOSING A PROCESSING CONTAINER

[75] Inventors: Mariano Peñaranda, Barcelona; Josep Agell, Esplugues de Llobregat; Sergi Gili, El Prat de Llobregat; Jose Luis Roman, Barcelona; Alejandro Hernandez, Santa Oliva, all of Spain

[73] Assignee: Braun Aktiengesellschaft, Frankfurt, Germany

[21] Appl. No.: 09/007,840

[22] Filed: Jan. 15, 1998

[30] Foreign Application Priority Data

Feb. 3, 1997 [DE] Germany ............................ 197 03 871

[51] Int. Cl.⁶ .................................................... B02C 18/12
[52] U.S. Cl. ............................................................ 241/282.1
[58] Field of Search .................................... 241/92, 282.1, 241/282.2, 291

[56] References Cited

FOREIGN PATENT DOCUMENTS

| | | |
|---|---|---|
| 0 071 496 | 2/1983 | European Pat. Off. . |
| 0 257 732 | 3/1988 | European Pat. Off. . |
| 0 529 287 | 3/1993 | European Pat. Off. . |
| 1859343 | 7/1962 | Germany . |
| 4128456 | 3/1993 | Germany . |
| 4414415 | 4/1995 | Germany . |
| WO 96/10943 | 4/1996 | WIPO . |
| WO 96/22720 | 8/1996 | WIPO . |

Primary Examiner—Mark Rosenbaum
Attorney, Agent, or Firm—Fish & Richardson P.C.

[57] ABSTRACT

The invention is directed to a lid (2) for closing a processing container (1). Provided in the processing container (1) is a spigot (4) for receiving a rotary processing tool (5) for comminuting food materials. The processing tool (5) has at its free end close to the lid (2) a first coupling member (18) adapted to be coupled to a second coupling member (17) of a driven shaft (10) when the lid (2) is placed on the processing container (1) for closing. The driven shaft (10) extends outwardly through a bore (9) in the lid (2) and has at its outer free end a third coupling member (27). The third coupling member (27) is adapted to be coupled to a fourth coupling member (33) of a drive shaft (31) of an electrically powered drive mechanism, in particular a hand-held mixer or immersion blender. An annular space (23) is formed between the outer diameter of the section (21) of the driven shaft (10) extending through the bore (9) and the bore (9).

24 Claims, 2 Drawing Sheets

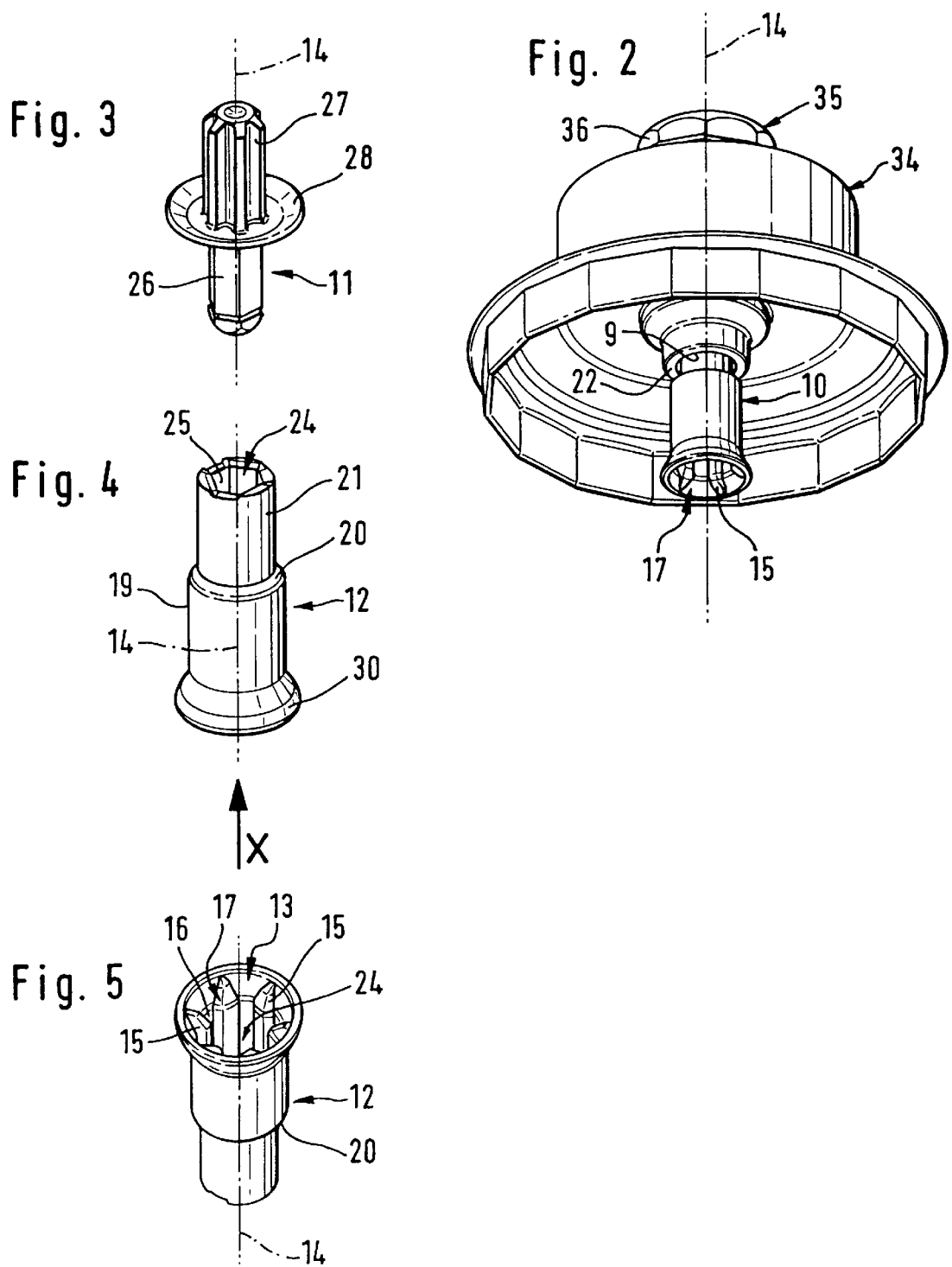

LID FOR CLOSING A PROCESSING CONTAINER

BACKGROUND OF THE INVENTION

This invention relates to a lid for closing a processing container having a base in which a spigot is provided for receiving a rotary processing tool for comminuting food materials, the processing tool having in its area close to the lid a first coupling member adapted to be coupled to a second coupling member of a driven shaft when the lid is placed on the processing container for closing, the driven shaft extending outwardly through a bore in the lid and having at its outer free end a third coupling member adapted to be coupled to a fourth coupling member of a drive shaft of an electrically powered drive mechanism, in particular a hand-held mixer or immersion blender.

A lid of this type is known in the art from the comminuting device disclosed in DE-A-41 28 456. This lid includes equally a driven shaft having at its end close to the processing container a second coupling member which is in meshing engagement with a first coupling member provided on the processing tool when the lid is closed. The driven shaft is carried and located centrally in the lid by means of a bearing element.

When a lid of this type is cleaned by hand or in a dish washer, food residues may enter the plain bearing between the driven shaft and the bearing element where they can be hardly removed, which involves the risk of premature wear of the bearing arrangement and, by reason of the attendant increased bearing friction, requires the drive mechanism to deliver increased power resulting in increased noise in operation. Moreover, in operation old food residues may travel from the bearing arrangement to the processing container unless elaborate sealing elements or very close-tolerance fits are utilized for the bearing.

SUMMARY OF THE INVENTION

It is therefore an object of the present invention to provide a lid having a driven shaft for closing a processing container, which lid can be cleaned with ease.

According to one aspect the present invention, this object is accomplished by the provision of a sufficiently large clearance between the driven shaft and the bore. Food residues can be removed from this clearance space when the lid is cleaned, because the space is sufficiently wide to enable water to pass through it readily. In particular when the lid is put in a dish washer, the bore can be cleaned automatically by a continuous flush of water. A lid cleaned in this way is then free of food residues, drying with ease and speed for subsequent use, in particular in the area of the bore through which the driven shaft extends. By reason of the non-contact bearing of the driven shaft relative to fixed parts in the lid, bearing noise is entirely avoided in this particular area.

Embodiments of this aspect of the invention may include one or more of the following features. To ensure operation of the comminuting device comprised of lid, processing container and processing tool with as little vibration as possible, the device can have the following feature. Only when the lid is properly placed down onto the processing container and the drive mechanism is seated on the lid, will the driven shaft have located itself centrally on the first and fourth coupling member through its second and third coupling member and will the driven shaft extend in an essentially spaced and concentric relationship to the bore of the lid. The dimensions between bore and driven shaft can be such that an annular space is produced.

Prior to seating the drive mechanism on the lid, the unit comprised of driven shaft and processing tool has only one end thereof centered by means of the spigot projecting from the base of the processing container, and yet this bearing is sufficient as long as the processing tool is not set in rotation. The bearing provided at the ends of processing tool and driven shaft also allows a small amount of offset of the longitudinal axis of the spigot relative to the longitudinal axis of the drive mechanism without involving the risk of jamming of the driven shaft and the processing tool.

The driven shaft can extend through the lid directly outwardly without the provision of an intermediate transmission mechanism. With an intermediate transmission mechanism, however, it would be necessary for the driven shaft to be carried freely in the lid and to be connected rotatably with a gear mechanism through teeth in the form of a sphere or a kind of universal joint whose output from the lid would require another driven shaft.

To prevent the driven shaft moving freely in the bore of the lid from sliding out of the bore, the shaft forms through its steps a stop for abutment with the walls bounding the bore.

Ease of assembly and fastening of the driven shaft to the lid is accomplished by inserting from either end of the bore a respective shaft section which are then in firm interfitting engagement, thus providing a single-part driven shaft on the lid. In one configuration, a pin of the one shaft section engages in a receptacle of the other shaft section in a centrally locating fashion.

A particularly nonrotative connection between the pin and the other shaft section is obtained by the provision of a polygon. A rotationally fixed connection between the two shaft sections is further accomplished by connecting these parts in a non-rotating relationship by pressing, adhesive bonding, screw-threading or in some other manner. A screw connection would even have the advantage of enabling the driven shaft to be demounted from the lid subsequently for replacement.

An embodiment of the present invention will be described in more detail in the following with reference to the accompanying drawings.

BRIEF DESCRIPTION OF THE DRAWINGS

FIG. 2 is a perspective view from below of the lid of the present invention illustrated in FIG. 1, but on a reduced scale;

FIG. 3 is a view of the upper shaft section of the driven shaft of FIG. 1;

FIG. 4 is a view of the lower shaft section of the driven shaft of FIGS. 1 and 2; and FIG. 5 is a view, in the direction of arrow X, of the first coupling member of the lower shaft section of FIG. 4.

DETAILED DESCRIPTION

Figure 1:
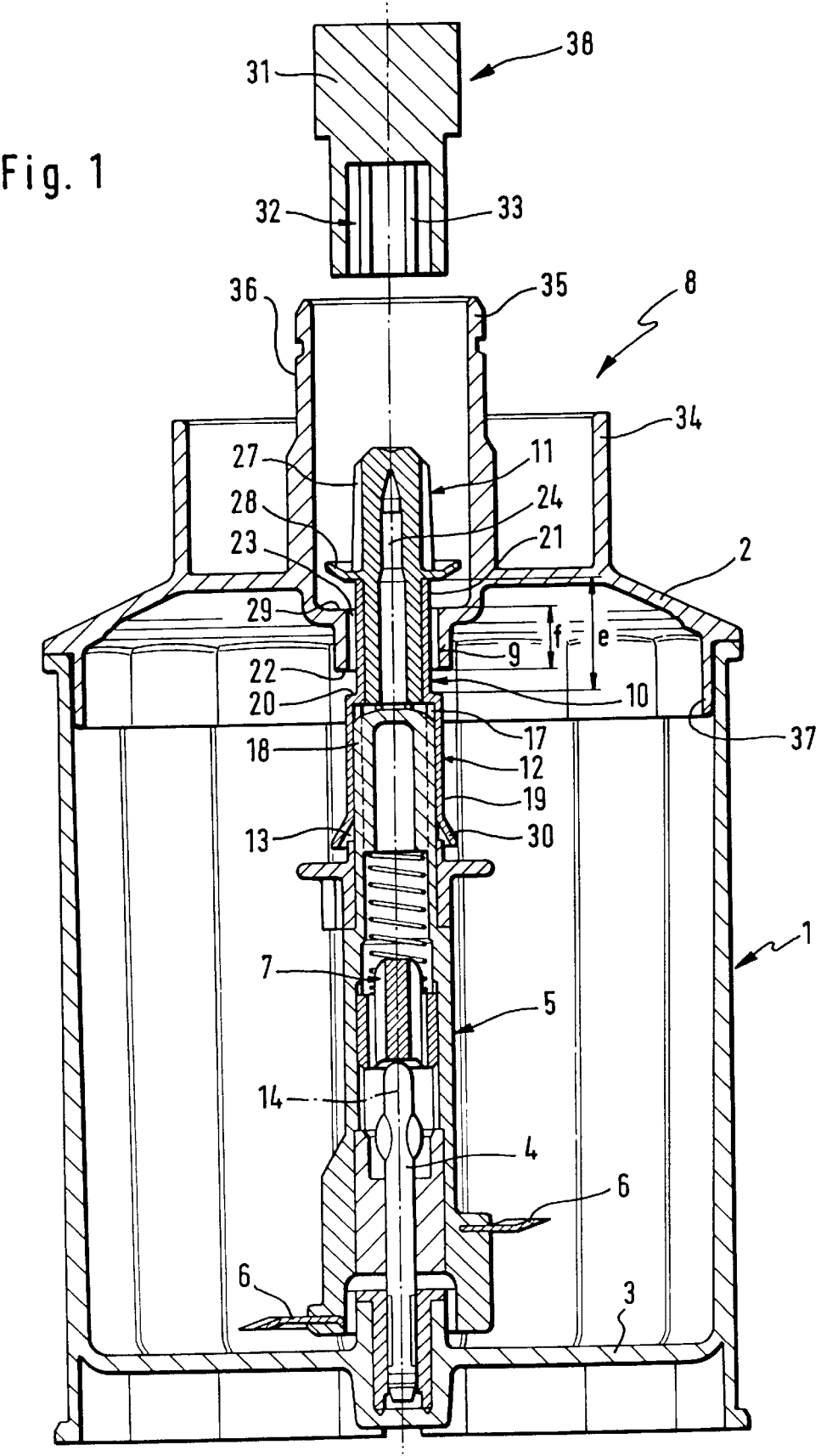
FIG. 1 is a longitudinal sectional view of a processing container showing the processing tool inserted and the lid of the present invention seated in place.

Referring now to FIG. 1 of the drawings, there is shown a processing container 1 of a comminuting device 8 which is closed by a lid 2. Extending upwardly from the base 3 of the processing container 1 is a spigot 4 made of stainless steel and configured as a guide pin or some other centering device on which a processing tool 5 having blades 6 is mounted for rotation when the lid 2 closes the processing container 1 properly, as shown in FIG. 1. The processing tool 5 is provided with a brake device 7 which operates to bring the processing tool 5 to a standstill as soon as the lid 2 is removed from the processing container 1 in an upward direction. The mode of operation of such a brake device being described in more detail in German Patent Application No. 41 28 456.9, it will not be discussed in greater detail here. Equally, the general arrangement is also known from this prior patent application, being readable upon the comminuting device 8 shown in FIG. 1 as is the mode of operation of the brake device.

As becomes apparent from FIGS. 1 and 2, the lid 2 has a central bore 9 through which a driven shaft 10 extends. The driven shaft 10 comprises an upper shaft section 11 and a lower shaft section 12. The lower shaft section 12 which is also shown in FIGS. 4 and 5 includes a bell-shaped recess in which ribs 15 are formed which extend parallel to the longitudinal axis 14 of the processing tool and define grooves 16 between them. The longitudinal axis 14 is at the same time the longitudinal axis of the comminuting device 8 and the drive mechanism 38 of FIG. 1 when the drive mechanism 38 is centrally located on the lid 2. The ribs 15 combine with the grooves 16 to form an elongated toothed portion 17 which is adapted to be coupled to an elongated toothed portion 18 (shown in broken lines) provided at the free end of the processing tool 5.

The elongated toothed portion 18 of the processing tool 5 forms the first coupling member, while the elongated toothed portion 17 at the lower shaft section 12 forms the second coupling member of the driven shaft 10. Approximately in the middle of the lower shaft section 12 on the outer periphery 19 thereof is a step 20 of gradually diminishing diameter, followed by a reduced-diameter section 21 in upward direction, when viewing FIG. 4. The diameter of the outer periphery 19 is larger than the diameter of the bore 9 in order to enable the step 20 to abut against the end surface 22 of the bore from outside when the driven shaft 10 is displaced upwardly against the lid 2 (FIG. 2). The diameter of the section 21 is some millimeters smaller than the diameter of the bore 9 in order to obtain a space 23 between these two sections 9, 21, preferably an annular space 23 where true running parts are involved, when the driven shaft 10 occupies the position shown in FIG. 1.

According to FIGS. 1, 4 and 5, a longitudinal bore 24 extends through the lower shaft section 12, the bore having at its upwardly open end a polygon 25, preferably a hexagon.

According to FIG. 3, the upper shaft section is comprised of a polygon pin 26 and a toothed section 27 provided at the upper end. The toothed section 27 which forms the third coupling member is separated from the polygon pin 26 by a dish-shaped collar 28 curved upwardly in the direction of the drive mechanism 38 to keep away foodstuffs or other liquids. According to FIGS. 3 and 4, the polygon pin 26 is inserted in the longitudinal bore 24 of the lower shaft section 12 which is thus rotationally fixed relative to the upper shaft section 11. For axially securing the two shaft sections 11, 12, the polygon pin 26 is a press-fit within the longitudinal bore 24. It is also possible for these two parts to be connected with each other by adhesive bonding, clipping together, screw-threading or other similar fastening means. However, the connection between the upper and lower shaft section 11, 12 is not established until the upper shaft section 11 of FIG. 1 is introduced from above, and the lower shaft section 12 is introduced from below, in the bore 9 of the lid 2, in order for these two parts to constitute the driven shaft 10 as a unitary component. Because the outer diameters of the collar 28 and the step 20 are greater than the diameter of the bore 9 in the lid 2, these parts abut against associated end surfaces 29 and 22, respectively, thereby preventing the driven shaft 10 from sliding out of the bore 9 and hence ensuring its firm connection with the lid 2.

Since the shortest distance e between the underside of the collar 28 and the step 20 is greater than the shortest distance f between the end surfaces 29 and 22, the driven shaft 10 is axially displaceable within the bore 9 by an amount corresponding to the difference between these two dimensions (e minus f), in addition to being inclinable until the upper or lower area of the section 21 of the driven shaft 10 abuts the opposite ends of the bore 9. To ensure that with the driven shaft 10 at its maximum inclination the elongated toothed portion 17 can always be seated onto the elongated toothed portion 18 of the processing tool 5 or engaged therewith without manual intervention, a bellmouth 30 is provided at the lower end of the lower shaft section 12 as shown in FIGS. 1 and 4.

Arranged above the comminuting device 8 is the drive shaft 31 of a drive mechanism 38 driven by a motor (not shown), in particular a hand-held mixer or immersion blender, the drive shaft having a toothed section 33 formed in a sleeve-shaped recess 32 and providing the fourth coupling member.

As the drive mechanism 38 is seated in place, the fourth coupling member 33 engages the third coupling member 27 of the driven shaft 10 in a manner preventing relative rotation. As this occurs, the drive mechanism 38 bears against the tubular mounts 34, 35 formed on the upper side of the lid 2, the mount 35 having a polygon 36 on its outer surface which engages the drive mechanism 38 in a non-rotating relationship in order to transmit the rotary motion exclusively to the drive shaft 31.

When the drive mechanism 38 is turned on, the rotary motion of the drive shaft 31 is transmitted to the driven shaft 10 and thus through the first and the second coupling member 17, 18. Crescent-shaped blades 6 on the processing tool 5 which extend diametrically to each other then comminute the food materials held in the processing container 1.

Any foodstuffs entering the bore 9 from below or from above can be flushed out of the bore 9 upon removal of the lid 2. Because in the operating condition the lid 2 is located centrally in the processing container 1 through its rim 37 while at the same time the spigot 4 and hence the processing tool 5 extend concentrically with the processing container 1, the driven shaft 10 which centers itself through the processing tool 5 extends likewise essentially concentrically with the bore 9, so that an annular space 23 is produced between the bore and the outer wall of the section 21, preventing the shaft from striking against the wall of the bore 9 in operation, thus avoiding noise and wear. This applies also when the drive shaft 31 is coupled to the driven shaft 10, because the drive mechanism 38 centers itself equally in the mounts 35 and 36 which extend concentrically with the lid 2.

What is claimed is:

1. A food processing apparatus for use with a drive mechanism, said apparatus comprising:
   a processing container having a top opening and including a rotary processing tool for comminuting food materials;
   a lid for closing the top opening of said container, said lid defining a bore, and said lid including a driven shaft that extends through said bore, said driven shaft adapted to be coupled to said processing tool when said lid is placed over said container, wherein said driven shaft has an outer surface, and said bore has an inner surface, said outer surface and inner surface defining a clearance therebetween, said clearance extending throughout said bore, and wherein said driven shaft is driven by said drive mechanism when operated.

2. The apparatus of claim 1, wherein said container further comprises a base, said base having a guide mechanism for receiving said processing tool.

3. The apparatus of claim 1, wherein said inner surface and said outer surface each comprise a generally cylindrical shape.

4. The apparatus of claim 1, wherein said processing tool has a first coupling member, and said driven shaft has a second coupling member, said first coupling member being adapted to be coupled to said second coupling member when said lid is placed over said container.

5. The apparatus of claim 4, wherein said first and second coupling members interfittingly engage when said lid is placed over said container, such that said driven shaft extends concentrically with said lid.

6. The apparatus of claim 5, wherein said clearance defined between said inner surface and said outer surface comprises a generally annular shape.

7. The apparatus of claim 1, wherein said driven shaft has an inner end and an outer end, said inner end comprising said second coupling member, and said outer end comprising a third coupling member adapted to be coupled with said drive mechanism.

8. The apparatus of claim 7, wherein said drive mechanism comprises an electrically powered drive shaft having a fourth coupling member adapted to be coupled with said third coupling member of said driven shaft.

9. The apparatus of claim 1, wherein said drive mechanism is selected from the group consisting of a hand-held mixer and an immersion blender.

10. The apparatus of claim 1, wherein said driven shaft comprises a first step and a second step, each said step having a radial dimension greater than a radial dimension of said bore, said steps being spaced on either end of said bore, whereby said steps prevent said driven shaft from exiting said lid.

11. The apparatus of claim 10, wherein said driven shaft comprises a generally cylindrical shape, and said first and second steps comprise generally circular projections extending from said driven shaft, said projections having diameters greater than a diameter of said bore.

12. The apparatus of claim 10, wherein said driven shaft comprises a first section including said first step, and a second section including said second step.

13. The apparatus of claim 12, wherein said first section of said driven shaft comprises a pin, and said second section of said driven shaft defines a longitudinal bore sized and shaped to receive said pin, wherein said pin, when inserted into said longitudinal bore, prevents relative rotation of said first and second sections of said driven shaft.

14. The apparatus of claim 13, wherein an exterior surface of said pin and an interior surface of said longitudinal bore comprise a generally polygonal shape.

15. The apparatus of claim 13, wherein a connection between said pin and said longitudinal bore is formed by a press fit.

16. The apparatus of claim 10, wherein a shortest distance between said first step and second step is larger than an axial length of said bore, such that said driven shaft is axially displaceable within said bore.

17. The apparatus of claim 1, wherein the outer surface of the driven shaft and the inner surface of the bore are dimensioned to form a non-contacting bearing.

18. The apparatus of claim 1, wherein the clearance between the outer surface of the driven shaft and the inner surface of the bore is sufficiently large to enable water to readily flow therebetween.

19. A lid for closing a top opening of a processing container, said container including a rotary processing tool for comminuting food materials, and said lid comprising:
   a longitudinal section defining a bore;
   a driven shaft extending through said bore, said driven shaft adapted to be coupled to said processing tool when said lid is placed over said container;
   wherein said driven shaft has an outer surface, and said bore has an inner surface, said outer surface and inner surfaces defining a clearance therebetween, said clearance extending throughout said bore.

20. The lid of claim 19, wherein said inner surface and said outer surface each comprise a generally cylindrical shape, such that said clearance comprises a generally annular shape.

21. The lid of claim 19, wherein said driven shaft comprises a first step and a second step, each said step having a radial dimension greater than a radial dimension of said bore, said steps being spaced on either end of said bore, whereby said steps prevent said driven shaft from exiting said lid.

22. The lid of claim 21, wherein a shortest distance between said first step and second step is larger than an axial length of said bore, such that said driven shaft is axially displaceable within said bore.

23. The lid of claim 19, wherein the outer surface of the driven shaft and the inner surface of the bore are dimensioned to form a non-contacting bearing.

24. The lid of claim 19, wherein the clearance between the outer surface of the driven shaft and the inner surface of the bore is sufficiently large to enable water to readily flow therebetween.

* * * * *